M. LEBLANC.
CONDENSER.
APPLICATION FILED NOV. 4, 1907.

984,279.

Patented Feb. 14, 1911.

WITNESSES:

INVENTOR.
Maurice Leblanc
BY
ATTORNEY IN FACT.

UNITED STATES PATENT OFFICE.

MAURICE LEBLANC, OF PARIS, FRANCE, ASSIGNOR TO SOCIETE ANONYME POUR L'EXPLOITATION DES PROCEDES WESTINGHOUSE-LEBLANC, OF PARIS, FRANCE.

CONDENSER.

984,279.  Specification of Letters Patent.  Patented Feb. 14, 1911.

Application filed November 4, 1907.  Serial No. 400,609.

*To all whom it may concern:*

Be it known that I, MAURICE LEBLANC, a citizen of the Republic of France, residing at Villa Montmorency, Auteuil, Paris, France, have made a new and useful Invention in Condensers, of which the following is a specification.

This invention relates to condensers.

Under ordinary conditions the minimum pressure that can be obtained within a condensing chamber is equal to a pressure which corresponds to the vapor-tension of the condensing water at the temperature at which it leaves the condenser; therefore, if the water leaving the condenser has a temperature of 35° C. the minimum pressure which it would be possible to obtain is 41.8 mm. of mercury.

An object of this invention is to produce a condenser in which it is possible to maintain an effective pressure which corresponds to the vapor tension of water at the mean temperature of the condensing water circulating through the condenser. This and other objects I attain by means of apparatus herein disclosed as embodying my invention.

Figure 1:
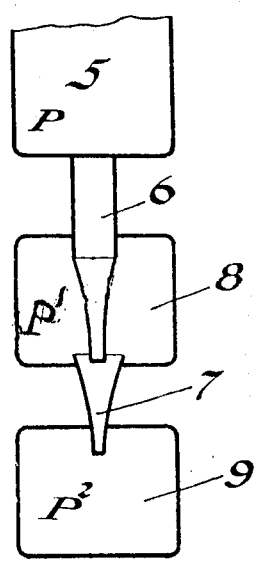
Figure 2:
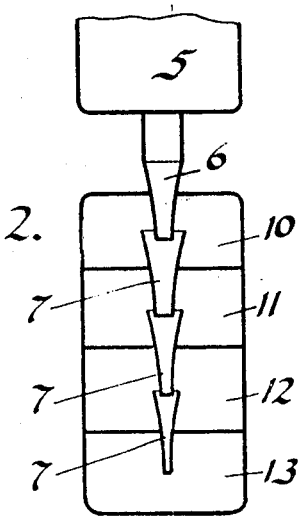
Figure 3:
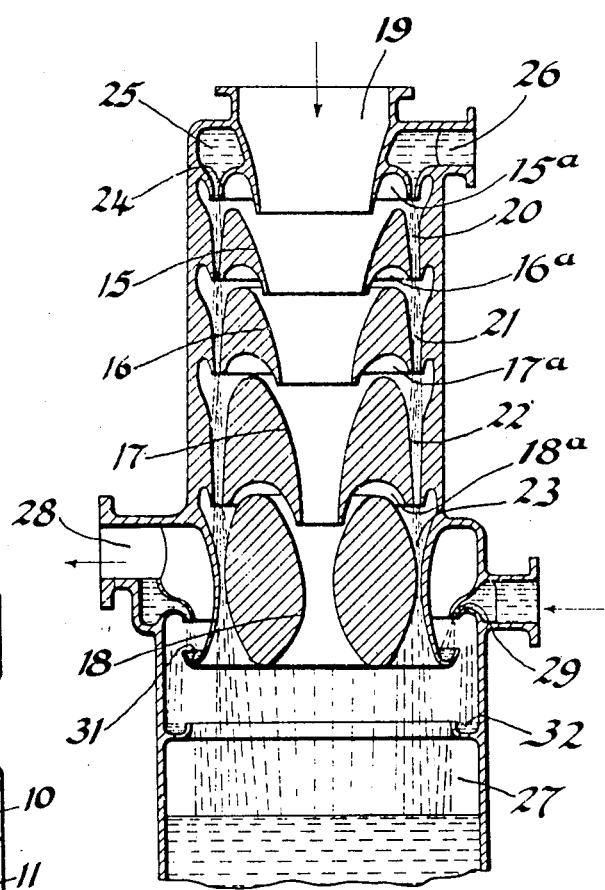

In the drawings accompanying this application and forming a part thereof: Figures 1 and 2 are diagrammatic arrangements of apparatus for illustrating the principles involved in my invention; and Fig. 3 is a vertical section of a jet condenser embodying my invention.

Referring to Fig. 1; a fluid flows from a reservoir 5 at a constant pressure P into a nozzle 6, which discharges into the interior of a converging or cone-shaped nozzle 7, the inlet end of which communicates with a chamber 8 and the outlet end of which communicates with a second chamber 9. A constant pressure $P^1$, which is less than P, is maintained in the chamber 8, while a pressure $P^2$ is maintained in the chamber 9. Theory and practice show that if the pressure $P^1$ is sufficiently low to cause a portion of the fluid delivered by the nozzle 6 to be reversed in its flow and enter the chamber 8, the remainder of the fluid will continue in the direction given it by the nozzle 6 and enter the chamber 9, even though the pressure $P^2$ in the chamber 9 is greater than the pressure P of the reservoir 5. The difference $P^2-P$ increases in proportion to increase of the difference $P-P^1$ and as the weight of the fluid entering the chamber 8 is increased in proportion to that of the fluid entering the chamber 9. This result can be accomplished because a portion of the fluid, or better, the molecules composing the fluid, cannot leave the stream, change the direction of their motion and enter the chamber 8 except by reacting on adjacent fluid, or molecules of the fluid, which continue to advance, and thereby imparting to them either an increase in velocity or an increase in pressure.

If the fluid traversing the nozzle 6 is steam or water vapor, the chambers 8 and 9 may constitute two surface or jet condensers which are cooled by the same circulating water because the water which has cooled the chamber 8 will be capable of cooling chamber 9, since the pressure, and consequently the temperature of the chamber 9 is greater than that of the chamber 8.

If the condensing water is discharged at the temperature of the condenser it will have a temperature which is higher than the initial temperature of the vapor to be condensed, since by hypothesis $P^2>P$. This is the result I have sought to accomplish.

Several chambers, in fact, any number of chambers may be utilized in connection with the chamber 5. In Fig. 2 I have shown a diagrammatic arrangement in which the chamber 5 communicates through the nozzle 6 with a number of chambers 10, 11, 12 and 13, which are arranged in series with reference to the delivery of the fluid from the chamber 5 and which are successively cooled by the same water or cooling liquid. The adjacent chambers are connected by converging or cone-shaped nozzles 7, and the delivery end of each of the intermediate nozzles 7 extends into the admission end of the next succeeding nozzle.

With reference to Fig. 2, assume that the cooling water is delivered to the chamber 10 at a temperature of 15° C. and is discharged from the chamber 13 at 35° C. and that the temperatures of the chambers 10, 11, 12 and 13 are respectively 20, 25, 30 and 35 degrees C. The temperature of the vapor in the reservoir 5, which in practice will be replaced by the exhaust pipe of the vapor engine, can be about 25° C. If the nozzle 6 under such conditions discharges 1 kgr. of vapor, the outlet ends of the nozzles 7 for the respective chambers 10, 11 and 12 will respectively discharge 0.750 kgr., 0.500 kgr. and 0.250 kgr.

In order to maintain a vacuum in a condenser it is necessary to not only cool the condenser but it is also necessary to withdraw the air which is there disengaged from the water and to withdraw the water. The apparatus described above comprises several elementary condensers and if it were necessary to provide a special water pump and a special air pump for each of these condensers the arrangement would be of little practical use. For this reason I prefer the arrangement shown in Fig. 3.

Referring to Fig. 3, a series of cone-shaped nozzles 15, 16, 17 and 18, which progressively decrease in sectional area, communicate by means of a nozzle 19 with the source of fluid or vapor to be condensed. The delivery end of each nozzle extends into the admission end of the next succeeding nozzle and the admission ends of the nozzles 15, 16, 17 and 18 respectively communicate, by means of annular chambers 15ª, 16ª, 17ª, and 18ª with the inlets of liquid ejectors 20, 21, 22 and 23, which are arranged in series and are traversed successively by the same liquid. The ejector 20 receives liquid from an annular nozzle 24, which communicates with and receives liquid from a chamber 25 formed in the walls of the condenser around the nozzle 19 and receiving liquid from a suitable source through a port 26. Each ejector comprises an annular nozzle which surrounds the correspondingly located fluid nozzle and which discharges liquid into the ejector located next below. The ejector 23 is a converging diverging nozzle and communicates with an ordinary condensing chamber 27, which, it is assumed, is provided with water and air pumps. The fluid or vapor to be condensed attains a high velocity as it passes the nozzle 19, due to the difference of pressure existing at the inlet and outlet ends of the nozzle. The existing conditions correspond to the theoretical condition described in connection with Figs. 1 and 2 and a portion only of the fluid issuing from the nozzle 19 is reversed in its flow, and the remaining fluid is discharged into the nozzle 15. The fluid reversed in its flow, due to the low pressure at the delivery end of the nozzle 19, is exposed to the condensing action of the liquid discharged from the nozzle 24 and also to the ejector action of the liquid stream as it enters the ejector 20 and is compressed by it into a more or less solid stream. The vapor is condensed by the cooling action of the liquid, and the air and other non-condensable gases are ejected by the ejector action of the liquid passing through the ejector 20. The portion of the fluid which escapes from the fluid stream at the discharge end of the nozzle 15 is subjected to the condensing and ejecting action of the liquid stream discharged from the ejector 20 and entering the ejector 21. This operation is repeated throughout the succession of nozzles until a portion of the fluid stream delivered by the nozzle 19 is finally ejected into a condensing chamber 27 by the converging diverging nozzle 18. The water, issuing from the last ejector 23, falls to the bottom of the chamber 27 and is withdrawn by any suitable pump and the entrained air is exhausted through a port 28, which is located near the top of the chamber. An annular nozzle 29 is located near the top of the chamber 27 and, receiving cooling liquid from any suitable source, discharges it in an annular stream onto an annular shelf 31, formed integrally with the walls of the ejector 23 and from which the liquid flows in a broken stream onto a second shelf 32 formed on the walls of the chamber 27. The liquid flows from the shelf 32 in a broken stream into the bottom of the chamber 27. With such an arrangement, the air leaving the chamber 27 must pass through the film of liquid discharged by the ejector 23 and also the films of colder liquid discharged by the annular nozzle 29 and flowing from the shelves 31 and 32, and is consequently cooled and reduced in volume. Since the liquid ejectors discharge into a condenser and not into the atmosphere, the total difference of pressure which they will have to overcome will always be very small. It will therefore be understood that if the amount of suction produced by the condensing liquid does not exceed 4 and 5 m.; that is to say, if the absolute pressure of the water discharged by the annular nozzle 24 is higher than 5 m., the *vis viva* which the liquid possesses on entering the apparatus will be sufficient to enable it to successively operate the superimposed ejector condensers and to drive from compartment to compartment the air and non-condensable gases which flow back with the vapor at the inlet or upper ends of the nozzles 15, 16, 17 and 18. The apparatus therefore utilizes all of the energy available in the fluid and liquid entering the condenser, in producing the desired vacuum.

The same fundamental arrangement is applicable to surface condensers. The film of condensing water and the ejectors are, however, replaced by a series of tubes through which the condensing water flows.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. A condenser comprising a series of communicating fluid nozzles communicating with a source of fluid to be condensed and progressively decreasing in cross-sectional area, in combination with a series of liquid ejectors, the inlet of each of which communicates with an inlet of one of the nozzles of said series.

2. A condenser comprising a series of fluid nozzles communicating with the source of fluid to be condensed, and progressively decreasing in cross-sectional area, in combination with a series of liquid ejectors, the inlet of each of which communicates with an inlet of one of the nozzles of said series, in combination with a condensing chamber, and means for introducing cooling liquid thereto and for withdrawing the water of condensation, the condensing liquid and the non-condensable gases.

3. A condenser comprising a series of nozzles communicating with the source of fluid to be condensed and progressively decreasing in cross sectional area, in combination with a series of liquid ejectors, the inlets of each ejector of said series communicating with an inlet of one of the nozzles of said series, a condensing chamber communicating with the last ejector of said series and receiving the fluid ejected from the last nozzle of said series, and means for withdrawing the water of condensation, the condensing liquid and the non-condensable gases therefrom.

4. In a condenser, a plurality of nozzles arranged to operate in series and the first of which communicates with the source of steam to be condensed, a hot well or collecting chamber into which the last of the series of nozzles discharge, and serially operating condensing means for creating a higher vacuum at the outlet of one of the first nozzles of the series than at the inlet to the first and successively increasing pressures at the outlet ends of the remainder of the nozzles of the series.

5. In a condenser, and in combination with a source of steam to be condensed, nozzles through which the steam to be condensed serially passes to the hot well or collecting chamber and serially arranged condensing means for maintaining a higher vacuum at the outlet of the first nozzle of the series than at the entrance of said first nozzle and progressively increasing pressures from there to the outlet of the last nozzle of the series.

6. In a condensing apparatus, an exhaust steam inlet, a cooling-water inlet, a hot well or collecting chamber, a plurality of overlapping nozzles arranged in series and through which the exhaust steam passes and a series of condensing means in open communication with the respective nozzles and through which the water of condensation serially passes.

7. In a condensing apparatus adapted to discharge into a collecting chamber or hot well, an inlet for the condensable vapors, a plurality of nozzles through which the condensable vapors are adapted to pass in series, a plurality of chambers, one communicating with the outlet of each nozzle, and means whereby cooling water is passed serially through said chambers and is finally discharged into said collecting chamber or hot well.

8. In a condensing apparatus, a series of nozzles through which the vapor to be condensed passes, and means for withdrawing a portion of the vapor traversing said nozzles from between intermediate nozzles of the series and for condensing the vapor withdrawn.

9. In a condensing apparatus, a plurality of overlapping nozzles arranged in series and of progressively decreasing area, a plurality of chambers arranged in series and in communication with said nozzles, means for segregating and conducting a portion of the steam passing through said nozzles into each of said chambers and means for condensing said segregated portions.

10. In a condensing apparatus, a passage of progressively decreasing area for the vapors to be condensed and means for withdrawing and condensing some of the vapors at a plurality of points along said passage whereby the water at the outlet of the apparatus is maintained at a higher temperature than the vapors at the entrance to said apparatus.

11. A condensing apparatus provided with an inlet for condensable vapors, a series of nozzles through which the vapor to be condensed is adapted to pass, and serially arranged condensing means for raising the pressure of a portion of the vapor traversing said nozzles to a pressure above the pressure of the vapor at the admission end of said series of nozzles.

12. In a condensing apparatus, a series of nozzles through which the vapor to be condensed passes and means for withdrawing a portion of the vapor traversing said nozzles from between intermediate nozzles of the series and for condensing the vapor withdrawn.

13. In a condensing apparatus provided with an inlet for condensable vapor, a passage of progressively decreasing cross-sectional area through which the vapor to be condensed is adapted to pass and means for withdrawing and condensing vapor from that traversing said passage whereby the pressure of the vapor continuing through said passage is raised above the pressure of the vapor entering the apparatus.

14. In a condensing apparatus provided with an inlet for condensable vapor, a passage through which the vapor to be condensed is adapted to pass, means for withdrawing and condensing vapor from that traversing said passage whereby the remaining vapor is raised above the pressure of the vapor entering the apparatus.

15. In a condensing apparatus, a passage for the vapors to be condensed, means for circulating condensing liquid through said condenser, and means for withdrawing and condensing vapor from that traversing said passage whereby the condensing liquid at the outlet of the apparatus is maintained at a higher temperature than the vapors at the entrance to the apparatus.

16. In a condenser, a series of over-lapping converging nozzles through which the vapor to be condensed passes, means for circulating condensing liquids through said condenser, exterior to said nozzles, separate condensing chambers communicating with the spaces between intermediate nozzles and means for circulating the condensing liquid through the successive condensing chambers in the direction of the flow of vapors to be condensed.

17. A condenser, a passage comprising a plurality of overlapping converging nozzles, separate condensing chambers communicating with spaces between intermediate nozzles and means for circulating cooling liquids successively through said chambers.

18. In combination with a condenser, a passage through which the vapor to be condensed passes and a plurality of separate condensing chambers communicating with openings provided throughout the length of said passage.

19. In a condensing apparatus, a series of nozzles through which the vapor to be condensed passes, means for withdrawing a portion of the vapor traversing the said nozzles from between intermediate nozzles of the series, separate means communicating with the separate spaces between intermediate nozzles for condensing the vapor withdrawn, and means whereby the condensing fluid is caused to circulate successively through said means in the direction of the flow of vapor.

20. In a condenser, a plurality of converging nozzles, arranged in a converging series, a series of chambers surrounding said nozzles and communicating with the spaces between successive nozzles and means for circulating condensing water successively through said chambers.

In testimony whereof I have hereunto subscribed my name this 14th day of October 1907.

MAURICE LEBLANC.

Witnesses:
H. C. COXE,
ALBERT DETAT.